United States Patent [19]
Sekendur

[11] Patent Number: 5,852,434
[45] Date of Patent: Dec. 22, 1998

[54] ABSOLUTE OPTICAL POSITION DETERMINATION

[76] Inventor: Oral F. Sekendur, 399 W. Fullerton Pkwy., Chicago, Ill. 60614

[21] Appl. No.: 574,117

[22] Filed: Dec. 18, 1995

Related U.S. Application Data

[63] Continuation-in-part of Ser. No. 862,977, Apr. 3, 1992, Pat. No. 5,477,012.

[51] Int. Cl.$^6$ .............................. G08C 21/00; G09G 5/00
[52] U.S. Cl. ................ 345/179; 178/18.01; 178/180.09; 178/19.01
[58] Field of Search ..................................... 345/156, 166, 345/173, 175, 179; 341/5, 13, 23; 235/454, 456; 178/18.01, 18.03, 18.05, 18.09, 19.01, 19.04, 19.05

[56] References Cited

U.S. PATENT DOCUMENTS

| | | | |
|---|---|---|---|
| 4,564,928 | 1/1986 | Gilenn et al. ............... | 178/18 |
| 4,581,483 | 4/1986 | Ralston ...................... | 178/18 |
| 4,712,100 | 12/1987 | Tsunekuni et al. ...................... | 345/166 |
| 5,051,736 | 9/1991 | Bennett ...................... | 178/19 |
| 5,086,197 | 2/1992 | Liou ......................... | 345/166 |
| 5,677,012 | 10/1997 | Sekendur ................... | 178/18 |

Primary Examiner—Vijay Shankar

[57] ABSTRACT

The present invention is a form of a digitizer and absolute position determination device for indicating the instantaneous position and movement of a stylus on a surface. It proposes the use of a data surface (e.g., paper) formatted with a position-related code for indicating X-Y coordinates capable of reflecting a frequency of light. The stylus FIG. 6 comprising a writing element 9 in FIG. 6 has a light source 17 in FIG. 6 of a frequency for illuminating the position-related code. The frequency of light is absorbed by the data surface but reflected by the position-related code onto a charge-coupled device (CCD) 13 in FIG. 6 located within the stylus. The coordinate information from the CCD is sent to a computer for processing and finally the desired information output to the user. The frequency(s) of light to be used depends on the application. For example, an infrared light source and infrared light reflecting position-related code can be used for hand writing on paper. The position-related code is invisible to the user and thus does not interfere with the visible writing formed by the writing element. During the process of writing on the data surface, the data surface is scanned of coordinates along the path of the writing element whereby the light is reflected by the position-related code onto the CCD. The coordinate data from the CCD is sent to the computer for analysis, and finally output to a computer display or computer printer. Through the use of handwriting recognition software, the output can be converted to a "keyboard-typed" representation of the handwritten text.

20 Claims, 4 Drawing Sheets

FIG. 1
FIG. 1a
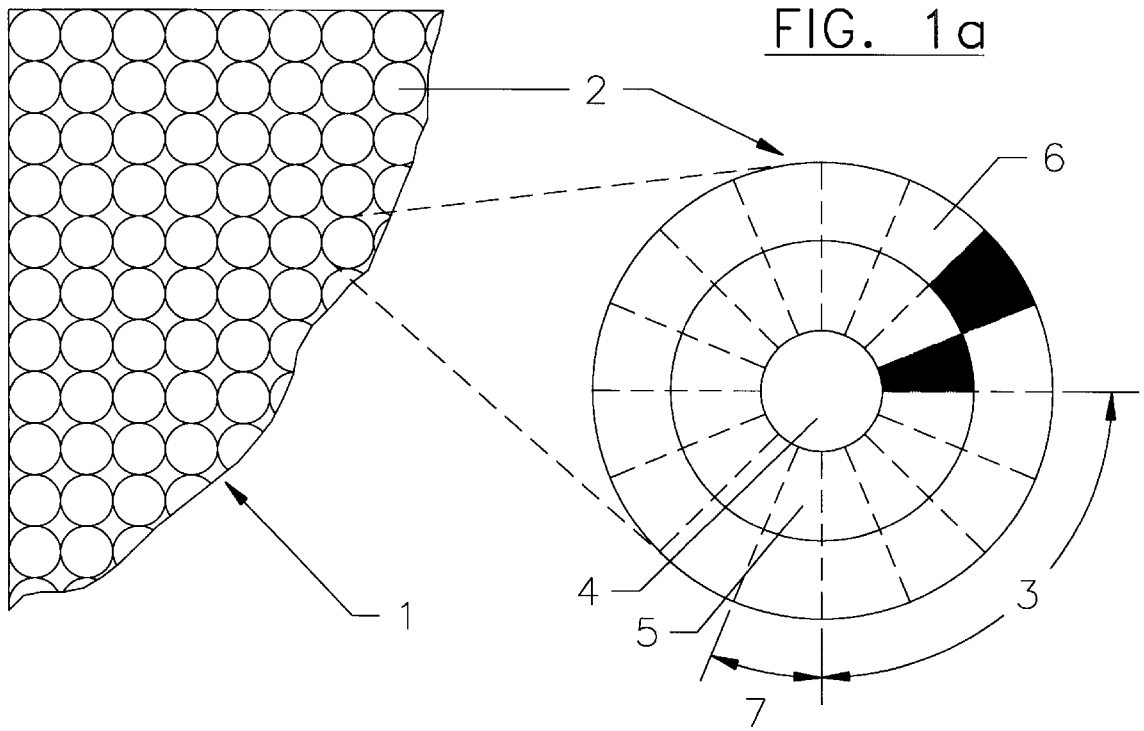
FIG. 2
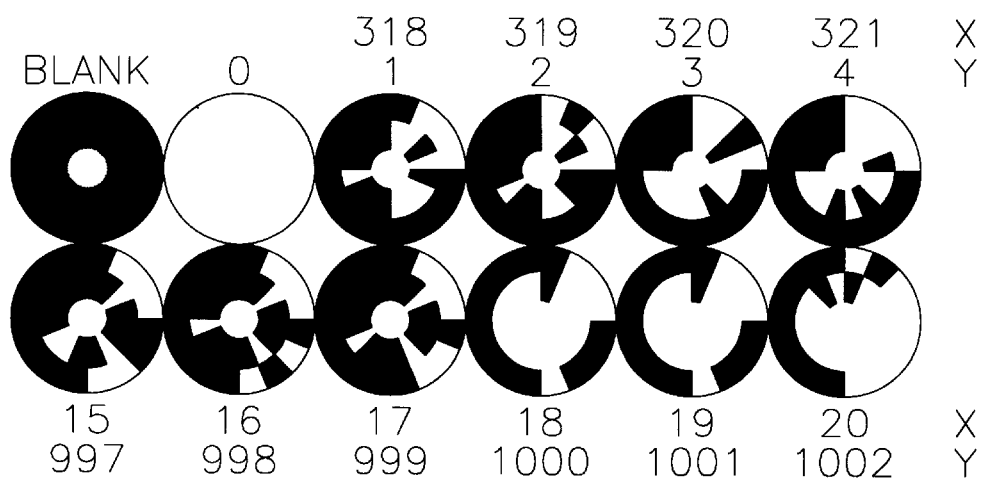

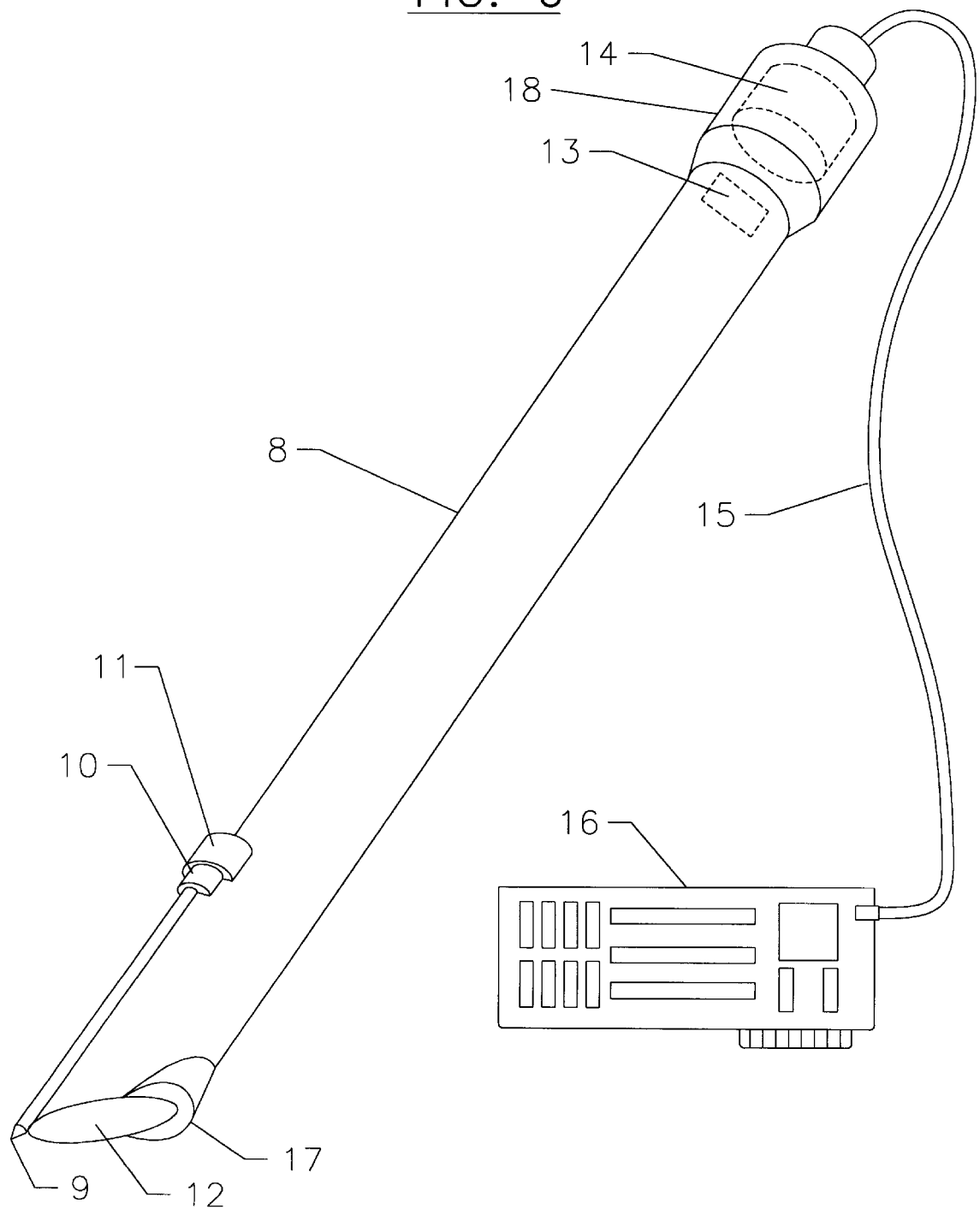

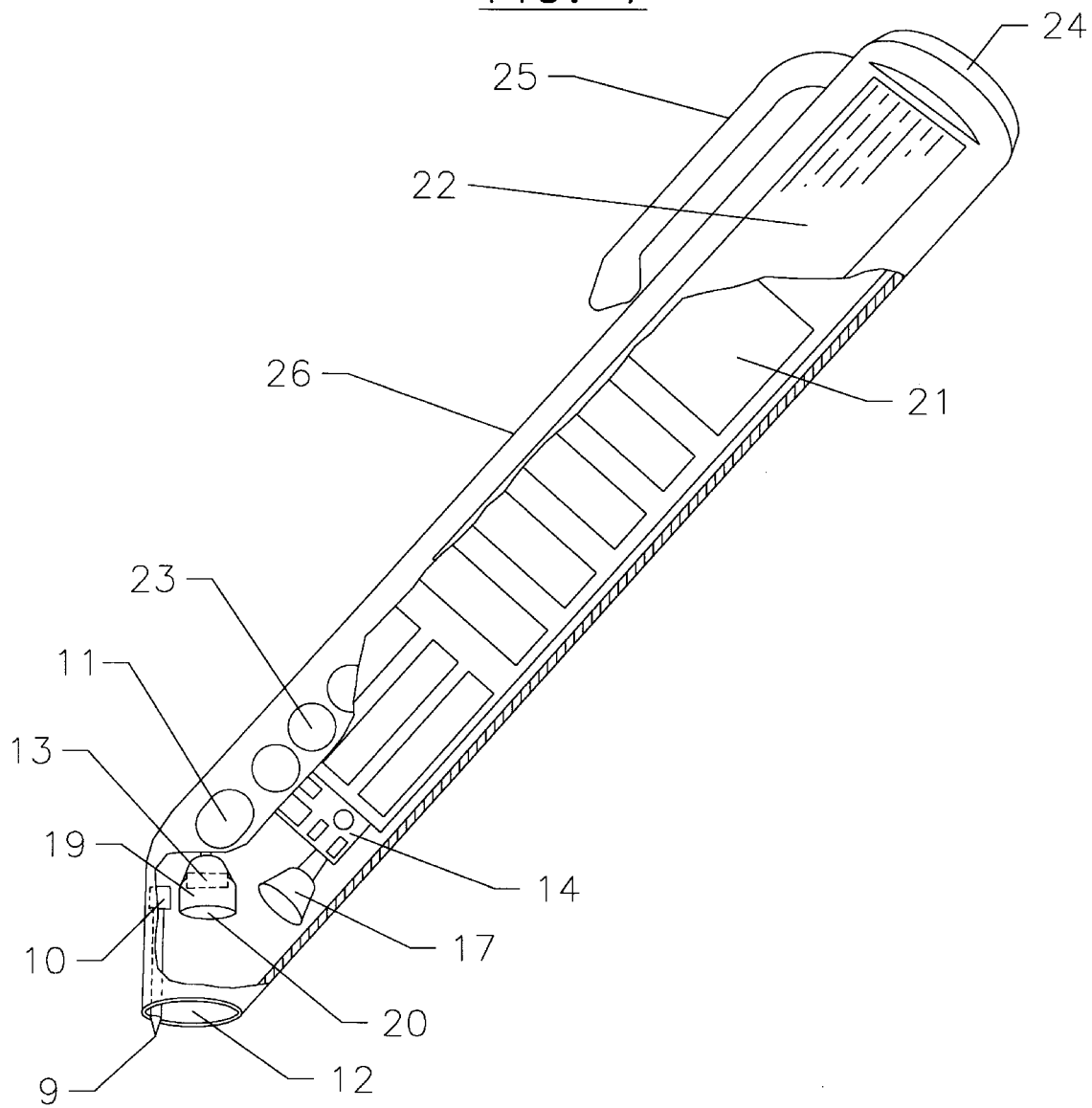

ABSOLUTE OPTICAL POSITION DETERMINATION

This application is a continuation-in-part of Ser. No. 07/862,977, filed Apr. 3, 1992 now U.S. Pat. No. 5,477,012.

FIELD OF THE INVENTION

This invention relates to apparatus and method for generating absolute position related computer data from obtaining and outputting the instantaneous position and/or movement of a moveable element on a data surface, such as might be used for determining the position and/or movement of a pen/pencil on paper. In addition, this invention will allow the user to input graphical information (e.g., drawings or handwriting) and simultaneously provide an original hard copy of the information.

BACKGROUND-DESCRIPTION OF PRIOR ART

The following United State Patents are believed to be most closely related to the present invention:
U.S. Pat. Nos.:

| | | | |
|---|---|---|---|
| 5,086,197 | 5,075,558 | 5,075,541 | 5,051,736 |
| 5,009,277 | 4,975,546 | 4,885,433 | 4,853,496 |
| 4,845,684 | 4,809,351 | 4,806,707 | 4,804,949 |
| 4,751,741 | 4,532,376 | 4,364,035 | 4,141,073 |

Many attempts have been made to determine the position of an object on a data surface in the form of computer data. Both two-dimensional and three-dimensional position determining devices now exist for inputting graphical data such as handwritten text, symbols, drawings, and so on. These devices determine the absolute position and/or movement of a stylus on a data surface by converting the position information into coordinates.

The use of a writing tablet and a stylus is common for inputting hand written data. Most two-dimensional devices require contact between the writing tablet and stylus. Three-dimensional devices usually do not require contact. They normally use a form of wave energy such as light, electromagnetic, or sonic energy.

Generally, two relationships exist between the stylus and the writing tablet. The passive stylus/active tablet utilizes a passive stylus interfacing with an active receiving surface (e.g., resistive and capacitive methods), while the active stylus/passive tablet utilizes an active stylus interfacing with a passive surface (e.g., optical, acoustic, tactile, or electromagnetic). A third method using a mechanical linkage such as a pantograph is rarely used.

The passive stylus/active surface method has some significant shortcomings. The most significant is the active surface or tablet itself. Besides being complex, large, heavy, cumbersome and difficult to transport, the tablet is expensive. Further, the tablet cannot usually distinguish between the stylus and another object pressing on it. Still further, active tablets are difficult to manufacture, subject to interference from outside factors, and have complex mechanical and electrical parts that are subject to malfunction.

The active stylus/passive surface method also has major drawbacks. Most significantly, this method generally requires an awkward tablet besides a separate transmitter and receiver (usually in different locations). Further, the transmitted signal can become obscured before reaching the receiver.

Another class of active stylus/passive surface devices provides relative position information. An example is the computer mouse that includes the mechanical mouse comprising a ball rolling on a surface, and the optical mouse comprising a surface with grid lines and an optical input means within the mouse.

Both the passive stylus/active surface and active stylus/passive surface methods have the feeling of being unnatural and require a significant interface adjustment for the user from the conventional pen/pencil and paper. The amount and accuracy of information provided by these methods are limited. In addition, some of these methods require a physical connection between the stylus and the tablet. All the methods provide two-dimensional information. Some provide three-dimensional information. Further, they may provide one or more, but not all the following information: displacement, rotation, angle to tablet, and velocity. None provide all of this information.

A significant advantage of the present invention is its interface. Overall, no matter how good a computer interface is, less of it would be better. The present invention allows for an interface that is almost identical to that of a pen/pencil and paper. The present invention is used in the same manner as a pen/pencil and paper and all of the computing is done in the background unnoticed by the user. The present invention turns an ordinary pen/pencil and paper into a powerful computer. The pen/pencil and paper are familiar and comfortable interfaces to the user. If the user is comfortable with the pen/pencil and paper then the user will be very comfortable with the present invention.

As part of output, the aforementioned methods can provide a printed hard copy, but they do not provide an original hard copy as part of the input. In the present invention, the information is input, analyzed, then output. Since the present invention teaches obtaining coordinate information by scanning a surface and simultaneously placing information on the surface by writing on the surface with a stylus, an original hard copy is produced as part of the input by writing or drawing on the surface.

OBJECTS AND ADVANTAGES

It is an object of the present invention to provide all of the aforementioned information.

It is an object of the present invention to overcome all of the aforementioned disadvantages.

It is an object of the present invention to provide an apparatus and method for obtaining and outputting the absolute position and/or movement of a moveable element on a data surface.

It is an object of the present invention to provide an apparatus and method for obtaining and outputting the absolute position and/or movement of a moveable element on a data surface for acquisition and output of hand written data.

It is an object of the present invention to provide a system that most closely resembles using pen/pencil and paper.

It is an object of the present invention to provide an original hard copy of data as part of the input process of writing on a surface.

It is an object of the present invention to provide an apparatus and method of the character described in which the absolute position and/or movement of the movable element can be precisely determined relative to a fixed reference.

It is an object of the present invention to provide an apparatus for hand held use.

It is an object of the present invention to provide the aforementioned movable element in the shape of a stylus.

It is an object of the present invention to provide an apparatus of the character described which does not require the use of a special digitizing tablet.

It is an object of the present invention to provide an apparatus of the character described which does not require the use of a special transmitter.

It is an object of the present invention to provide an apparatus of the character described which can use a writing surface such as paper formatted with a position-related coding means for indicating X-Y coordinates.

It is an object of the present invention to provide an apparatus of the character described which can use a writing surface such as paper formatted with a position-related coding means for indicating X-Y coordinates by the stylus at the time of use.

It is an object of the present invention to provide an apparatus and method for obtaining and outputting the position and/or movement of a moveable element on a data surface comprising: a writing surface formatted with a position-related coding means for indicating X-Y coordinates, an optical data input means or detector means, a data processing means, and a data output means.

It is an object of the present invention to provide an apparatus and method for precisely locating the absolute position and/or movement of a movable element within a plane. More particularly, it is an object of the invention to provide an input/output apparatus for use with a computer that includes a movable element, whose absolute position and/or movement within a plane can be determined with or without a physical connection between the movable element and the plane.

It is an object of the present invention to provide an apparatus and method for handwriting recognition.

It is an object of the present invention to provide an apparatus and method for optical character recognition (OCR).

It is an object of the present invention to provide an apparatus and method for signature verification.

It is an object of the present invention to provide an apparatus and method for handwriting verification.

It is an object of the present invention to provide an apparatus and method for finger print recognition.

It is an object of the present invention to provide an apparatus and method for graphical recognition.

It is an object of the present invention to provide an apparatus and method for graphical input.

It is an object of the present invention to provide an apparatus and method for forms processing.

It is an object of the present invention to provide an apparatus and method for converting optically input data into coordinate data.

It is an object of the present invention to provide an apparatus and method for formatting a writing surface with coordinate data.

It is an object of the present invention to provide an apparatus and method for formatting a writing surface with coordinate data including (1) printing the writing surface with coordinate codes, (2) overlaying a writing surface with carbon paper, film, template, plate, or the like comprising the coordinate code, or overlaying a surface with at least one coding means, and (3) formatting the writing surface by writing on it while scanning, then using the written data for coordinates.

It is an object of the present invention to provide an apparatus and method for formatting a writing surface with coordinate data including (1) printing the writing surface with coordinate codes using ink that reflects only the desired frequency(s) of light, (2) overlaying a writing surface with a carbon paper, film, template, plate, or the like comprising the coordinate code whereby the code reflects the particular frequency of light and/or pattern to be scanned, or overlaying a surface with at least one coding means reflecting the particular frequency of light and/or pattern to be scanned, and (3) formatting the writing surface by writing on it while scanning, then using the written data as points of reference.

It is an object of the present invention to provide an apparatus and method for providing analog data.

It is an object of the present invention to provide an apparatus and method for providing digital data.

It is an object of the present invention to provide an apparatus and method for digitizing optical data.

It is an object of the present invention to provide an apparatus and method for learning a data surface.

It is an object of the present invention to provide a data surface is made of a material selected from the group consisting of paper, plastic, glass, metal, synthetic fiber, synthetic material, natural material, and a paper like substance.

DESCRIPTION OF DRAWINGS

FIG. 1 is an example of a coding means using dots.

FIG. 1a is an enlarged view of the coding means in FIG. 1.

FIG. 2 is an example of dots representing coordinates.

FIG. 6 is a perspective view of an embodiment using an image conduit and a PC board.

FIG. 7 is a perspective view of an embodiment using a self-contained stylus.

REFERENCE NUMERALS IN DRAWINGS

Figure 3:
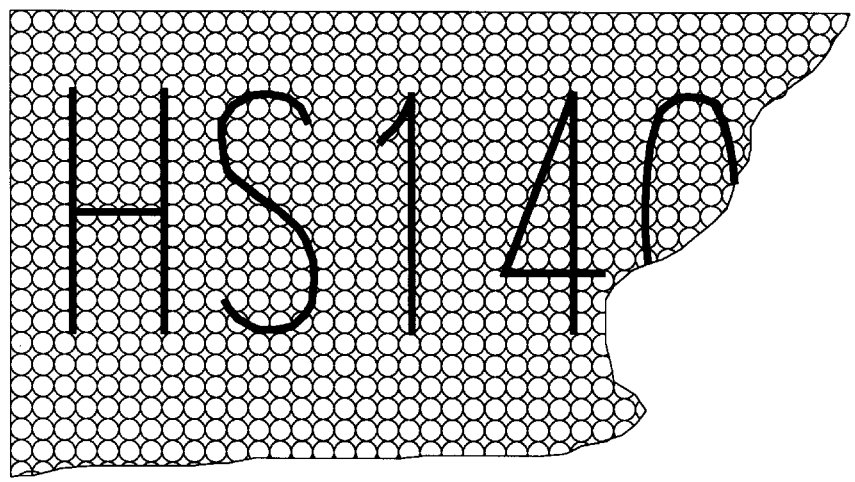
FIG. 3 is an example of written text on a coded writing surface of dots.

| 1  | coded surface     | 2  | dot                  |
|----|-------------------|----|----------------------|
| 3  | quadrant of dot   | 4  | center circle        |
| 5  | inner ring        | 6  | outer ring           |
| 7  | ring slices       | 8  | optical conduit      |
| 9  | writing element   | 10 | pressure switch      |
| 11 | manual switch     | 12 | lens or light filter |
| 13 | CCD               | 14 | electronic interface |
| 15 | cable             | 16 | PC board             |
| 17 | light source      | 18 | protective casing    |
| 19 | optical element   | 20 | lens                 |
| 21 | microcomputer     | 22 | touch screen display |
| 23 | function keys     | 24 | wireless transceiver |
| 25 | pen/pencil clip   |    |                      |

DESCRIPTION OF PREFERRED EMBODIMENTS

The present invention aims to overcome the aforementioned disadvantages and to provide a system that most closely emulates the use pen/pencil and paper.

Accordingly, the present invention proposes the use of a data surface or more particularly a writing surface such as paper, formatted with a position-related coding means for indicating X-Y coordinates capable of reflecting a frequency of light. The stylus or pen/pencil has a light source of a frequency for illuminating the surface. The frequency(s) of light is absorbed by the surrounding writing surface but reflected by the coding means into the stylus onto a charge-coupled device (CCD) or detector within the stylus. An output signal from the CCD or array of light sensitive elements is sent to a computer or processor for processing and finally output to the user. The output can be in various forms including an image on a computer display or a computer printout.

The frequency(s) of light to be used depends on the application. For example, infrared light and light reflecting means can be used for hand writing or drawing on paper. Infrared light is invisible to the user and thus does not interfere with the hand-formed images. The position related coding reflects the selected frequency of light and the detector picks up the selected frequency of light.

One embodiment comprises a writing surface systematically coded with a plurality of dots 1 in FIG. 1 designating coordinates. A sample dot 2 in FIG. 1*a* is divided into three concentric circles partitioned into quadrants 3 in FIG. 1*a*. The center circle 4 in FIG. 1*a* forms a small circle, while the other circles form the inner 5 in FIG. 1*a* and outer 6 in FIG. 1*a* rings. Each quadrant of each ring represents a digit of a four-digit number and is further divided into four equal slices 7 in FIG. 1*a*. The upper right quadrant of each ring is the first digit moving clockwise. The outer ring represents the X coordinate and the inner ring represents the Y coordinate. A combination of dark and light slices in the rings of each dot indicates an X-Y coordinate in FIG. 2. The center dot may be used for additional data. For example, a combination of light and dark slices of the center dot can indicate moving the decimal point of the X-Y coordinate the desired number of digits to the right, thus substantially increasing the number of possible coordinates.

The process of writing or drawing FIG. 3 on the writing surface causes coordinates to be scanned, input, analyzed, and output. Thus, the path of the stylus and, more particularly, the writing tip is determined. Well-known techniques such as interpolation, extrapolation, and triangulation may be used to help determine the path of the stylus.

Figure 4:
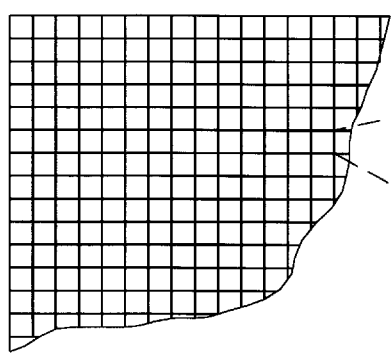
FIG. 4 is an example of a coding means using bar codes.
Figure 4A:
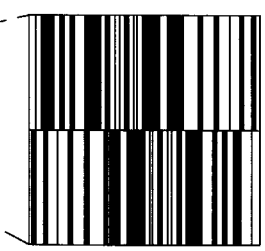
FIG. 4a is an enlarged view of the coding means in FIG. 4.
Figure 5A:
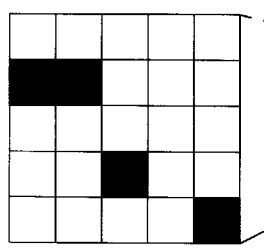
FIG. 5a is an enlarged view of the coding means in FIG. 5.
Figure 5:
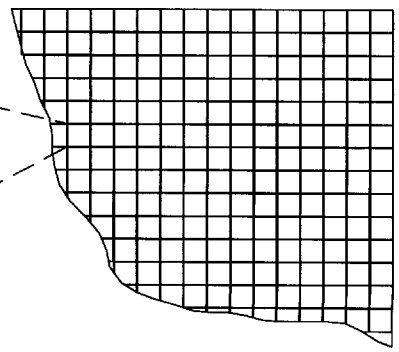
FIG. 5 is an example of a coding means using checkerboard-like cubes.

Alternatively, the position-related coding means comprises any means for indicating coordinates. For example, a bar code system FIG. 4 and FIG. 4*a* or a system of checkerboard-like cubes FIG. 5 and FIG. 5*a* can be used.

As well, the means for formatting comprises any means for imposing coordinates onto a surface, including (1) printing the writing surface with coordinate codes using any means that reflects only the desired frequency(s) of light, (2) overlaying a writing surface with carbon paper, film, template, plate, or the like comprising the coordinate code whereby the code reflects the desired frequency(s) of light, or overlaying a surface with at least one coding means reflecting the desired frequency of light and/or pattern to be scanned, and (3) formatting the writing surface by writing or drawing on it while scanning, then using the hand formed graphical information as points of reference.

In a first embodiment, the stylus is composed of a pen-shaped optical conduit 8 in FIG. 6. At the lower scanning end is a replaceable and/or retractable writing element 9 in FIG. 6 connected to a pressure sensitive on/off switch 10 in FIG. 6. A manual override on/off switch 11 in FIG. 6 is provided. The scanning end is angled at 45 degrees away from the writing element to be generally level with the writing surface and is optically formed to read close to the surface. The stylus can scan with the writing element enabled or retracted. Optionally, the scanning end comprises a lens, lens shade, and/or light filter 12 in FIG. 6 and the stylus can scan at various distances depending on the lens used. The stylus can scan and write simultaneously, scan only when the writing element is retracted, write only when the scanning feature is not activated, or scan in all modes, depending on the function selected.

The upper end of the stylus comprises a CCD 13 in FIG. 6 facing down toward the scanning end. Connected to the CCD is an interface means 14 in FIG. 6 for interfacing the CCD to the cable 15 in FIG. 6. The cable in turn is connected to a PC board 16 in FIG. 6 placed inside a personal computer. The light source 17 in FIG. 6 is optionally placed at the upper or lower end of the stylus. Wires connect the electronic components. The upper end of the stylus is enclosed with a protective casing 18 in FIG. 6.

A second embodiment comprises the aforementioned writing surface and a self-contained pen-shaped stylus. The stylus includes a replaceable and retractable writing element 9 in FIG. 7 at the lower end connected to a pressure sensitive on/off switch 10 in FIG. 7. A manual override on/off switch 11 in FIG. 7 is provided. The scanning end is open and angled at 45 degrees away from the writing element to be generally level with the writing surface. Inside the stylus above the opening is the optical element 19 in FIG. 7, optically formed to read close to the surface. The stylus can scan with the writing element enabled or retracted. At the bottom of the optical element is a lens, lens shade, and/or light filter 20 in FIG. 7. Optionally, the scanning end comprises an interchangeable lens, lens shade, and/or light filter 12 in FIG. 7. The CCD 13 in FIG. 7 is within the optical element. A microcomputer 21 in FIG. 7 is within the stylus. An interface means 14 in FIG. 7 interfaces the CCD and other components to the microcomputer. The light source 17 in FIG. 7 is placed at the lower end within the stylus near the optical element. Wires interface the various components. On the side is a touch screen display 22 in FIG. 7. Function keys 23 in FIG. 7 are near the lower end of the stylus below the touch screen. On the upper end is a wireless transceiver 24 in FIG. 7 for communicating with other devices. Optionally, a pen clip 25 in FIG. 7 is near the upper end.

During the process of writing, the writing surface is scanned of coordinates whereby the light is reflected from the surface, and onto the CCD. Data from the CCD is sent to the micro processor for analysis, and finally output onto a screen.

I claim:

1. A coordinate sensor comprising:

a data surface formatted with at least one coding means for designating coordinates of at least one point on said data surface;

a detector means for detecting said at least one coding means and for generating at least one output signal thereof;

a processing means for receiving and processing said at least one output signal, thereby to determine the position of said detector means relative to said data surface;

whereby said data surface comprises a writing surface.

2. A coordinate sensor according to claim 1, whereby:

said data surface comprises at least one dimension;

said at least one coding means comprises coordinates for at least one dimension;

said detector means comprises an array of light sensitive elements grouped together in at least one dimension.

3. A coordinate sensor according to claim 1, whereby:

said data surface comprises a substantially planar face;

said at least one coding means comprises coordinates for two dimensions for a plurality of points on said data surface;

said detector means comprises an array of light sensitive elements grouped together in two dimensions.

4. A coordinate sensor according to claim 1, whereby:

said at least one coding means comprises an optical image;

said detector means comprises an array of light sensitive elements;

said processing means comprises a computer.

5. A coordinate sensor according to claim 1 selected from the group consisting of said coordinate sensor whereby said coordinate sensor is designed for use with a computer, said coordinate sensor whereby said coordinate sensor comprises a computer display, said coordinate sensor whereby said coordinate sensor comprises a computer printer, said coordinate sensor whereby said coordinate sensor comprises a computer, said coordinate sensor whereby said processing means comprises a computer, said coordinate sensor whereby said at least one coding means is printed on said data surface, said coordinate sensor whereby said detector means comprises a writing means for writing on said data surface, said coordinate sensor whereby said detector means comprises a writing means for writing on said data surface and further comprises an original hard copy means for forming an original hard copy made by said writing means on said data surface, said coordinate sensor whereby said data surface is made of a material selected from the group consisting of paper, plastic, glass, metal, synthetic fiber, synthetic material, natural material, and a paper like substance, said coordinate sensor whereby said at least one coding means comprises a reflecting means for reflecting said at least one coding means to said detector means, said coordinate sensor whereby said detector means is selected from the group consisting of a stylus shaped detector means for hand held use, and a hand held detector means suitable for hand held use, said coordinate sensor whereby said data surface comprises an overlay means for overlaying a surface with said overlay means selected from the group consisting of carbon paper, film, template, and plate, whereby said carbon paper, film, template, and plate comprise said at least one coding means, said coordinate sensor whereby said data surface comprises an overlay means for overlaying a surface with said at least one coding means, said coordinate sensor whereby said processing means uses the principle of interpolation to determine the position of said detector means relative to said data surface, said coordinate sensor whereby said processing means uses the principle of extrapolation to determine the position of said detector means relative to said data surface, said coordinate sensor whereby said processing means uses the principle of triangulation to determine the position of said detector means relative to said data surface, said coordinate sensor whereby said at least one coding means comprises a selective reflecting means for selectively reflecting at least one selected frequency of light, and said coordinate sensor whereby said detector means comprises a selective detecting means for selectively detecting at least one selected frequency of light.

6. A coordinate sensor according to claim 1 comprising:

said at least one coding means, whereby said at least one coding means comprises coordinates for a plurality of points on said data surface;

a moveable element comprising said detector means, whereby said movable element is movable relative to said data surface;

means for determining the path of said moveable element by detecting a sequence of coordinates of said plurality of points in the path of said movable element.

7. A coordinate sensor according to claim 6, comprising means for analyzing the path of said moveable element.

8. A coordinate sensor according to claim 1 whereby said detector means is selected from the group consisting of an optical stylus comprising a rod shaped optical conduit body member including
a writing means for writing on said data surface and
a detecting means for detecting and outputting said at least one coding means;

an optical stylus comprising
a writing means for writing on said data surface and
a detecting means for detecting and outputting said at least one coding means; and a self-contained optical stylus comprising
a writing means for writing on said data surface,
a detecting means for detecting and outputting said at least one coding means,
a microcomputer,
a user interface means for communicating with a user, and
a device interface means for communicating with other devices.

9. A coordinate sensor according to claim 1, whereby said at least one coding means comprises:

a plurality of dots systematically coded on said data surface;
each of the plurality of dots comprising three concentric circles partitioned into quadrants;
including a center circle,
an outer ring and an inner ring, whereby
the outer ring represents an X coordinate and the inner ring represents a Y coordinate;
each quadrant of the outer ring and the inner ring representing a digit of a four digit number and further comprising four equal slices; whereby
the upper right quadrants of the outer ring and the inner ring represent the first digit of the
four digit number moving clockwise,
a combination of dark and light slices indicate an X-Y coordinate, and
the center circle optionally represents additional data.

10. A coordinate sensor comprising:

a data surface comprising a substantially two dimensional planar face formatted with at least one coding means for designating two dimensional coordinates of at least one point on said data surface;

a detector means comprising an array of light sensitive elements grouped together in two dimensions for detecting said at least one coding means, and an output means for generating at least one output signal thereof;

a processing means for receiving and processing said at least one output signal from said detector means, thereby to determine the position of said detector means relative to said data surface;

whereby said data surface comprises a writing surface.

11. A coordinate sensor according to claim 10 selected from the group consisting of said coordinate sensor whereby said coordinate sensor is designed for use with a computer, said coordinate sensor whereby said coordinate sensor comprises a computer display, said coordinate sensor whereby said coordinate sensor comprises a computer printer, said coordinate sensor whereby said coordinate sensor comprises a computer, said coordinate sensor whereby said coordinate means comprises a computer, said coordinate sensor whereby said at least one coding means is printed on said data surface, said coordinate sensor whereby said detector means comprises a writing means for writing on said data surface, said coordinate sensor whereby said detector means comprises a writing means for writing on said data surface and further comprises an original hard copy means for forming an original hard copy made by said writing means on said data surface, said coordinate sensor whereby said data surface is made of a material selected from the group consisting of paper, plastic, glass, metal, synthetic fiber, synthetic material, natural material, and a paper like substance, said coordinate sensor whereby said at least one coding means comprises a reflecting means for reflecting said at least one coding means to said detector means, said coordinate sensor whereby said detector means is selected from the group consisting of a stylus shaped detector means for hand held use, and a hand held detector means suitable for hand held use, said coordinate sensor whereby said data surface comprises an overlay means for overlaying a surface with said overlay means selected from the group consisting of carbon paper, film, template, and plate, whereby said carbon paper, film, template, and plate comprise said at least one coding means, said coordinate sensor whereby said data surface comprises an overlay means for overlaying a surface with said at least one coding means, said coordinate sensor whereby said processing means uses the principle of interpolation to determine the position of said detector means relative to said data surface, said coordinate sensor whereby said processing means uses the principle of extrapolation to determine the position of said detector means relative to said data surface, said coordinate sensor whereby said processing means uses the principle of triangulation to determine the position of said detector means relative to said data surface, said coordinate sensor whereby said at least one coding means comprises a selective reflecting means for selectively reflecting at least one selected frequency of light, and said coordinate sensor whereby said detector means comprises a selective detecting means for selectively detecting at least one selected frequency of light.

12. A coordinate sensor according to claim 10, comprising:

said at least one coding means, whereby said at least one coding means comprises coordinates for a plurality of points on said data surface;

a moveable element comprising said detector means, whereby said movable element is movable relative to said data surface;

means for determining the path of said moveable element by detecting a sequence of coordinates of said plurality of points in the path of said movable element.

13. A coordinate sensor according to claim 12 comprising means for analyzing the path of said moveable element.

14. A coordinate sensor according to claim 10, whereby said detector means is selected from the group consisting of an optical stylus comprising a rod shaped optical conduit body member including
a writing means for writing on said data surface and
a detecting means for detecting and outputting said at least one coding means;

an optical stylus comprising
a writing means for writing on said data surface and
a detecting means for detecting and outputting said at least one coding means; and a self-contained optical stylus comprising
a writing means for writing on said data surface,
a detecting means for detecting and outputting said at least one coding means,
a microcomputer,
a user interface means for communicating with a user, and
a device interface means for communicating with other devices.

15. A coordinate sensor according to claim 10, whereby said at least one coding means comprises:

a plurality of dots systematically coded on said data surface;

each of the plurality of dots comprising three concentric circles partitioned into quadrants;
including a center circle,
an outer ring and an inner ring, whereby
the outer ring represents an X coordinate and the inner ring represents a Y coordinate;
each quadrant of the outer ring and the inner ring representing a digit of a four digit number and further comprising four equal slices; whereby
the upper right quadrants of the outer ring and the inner ring represent the first digit of the four digit number moving clockwise,
a combination of dark and light slices indicate an X-Y coordinate, and
the center circle optionally represents additional data.

16. An apparatus for obtaining and outputting the position and movement of a moveable element on a data surface comprising:

said data surface formatted with a position-related coding means for indicating X-Y coordinates, an data input means for obtaining and outputting position-related data from said position-related coding means, a data processing means for obtaining and analyzing position-related data from said data input means, and a data output means for outputting analyzed position-related data.

whereby said data surface comprises a writing surface.

17. An apparatus for obtaining and outputting the position and movement of a moveable element on a data surface according to claim 16, selected from the group consisting of said apparatus whereby said apparatus is designed for use with a computer, said apparatus whereby said apparatus comprises a computer display, said apparatus whereby said apparatus comprises a computer printer, said apparatus whereby said apparatus comprises a computer, said apparatus whereby said data processing means comprises a computer, said apparatus whereby said position-related coding means is printed on said data surface, said apparatus whereby said data input means comprises a writing means for writing on said data surface, said apparatus whereby said data input means comprises a writing means for writing on said data surface and further comprises an original hard copy means for forming an original hard copy made by said writing means on said data surface, said apparatus whereby said data surface is made of a material selected from the group consisting of paper, plastic, glass, metal, synthetic fiber, synthetic material, natural material, and a paper like substance, said apparatus whereby said position-related coding means comprises a reflecting means for reflecting said position-related coding means to said data input means, said apparatus whereby said data input means is selected from the group consisting of a stylus shaped data input means for hand held use, and a hand held data input means suitable for hand held use, said apparatus whereby said data surface comprises an overlay means for overlaying a surface with said overlay means selected from the group consisting of carbon paper, film, template, and plate, whereby said carbon paper, film, template, and plate comprise said position-related coding means, said apparatus whereby said data surface comprises an overlay means for overlaying a surface said position related coding means, said apparatus whereby said data processing means uses the principle of interpolation to determine the position of said data input means relative to said data surface, said apparatus whereby said data processing means uses the principle of extrapolation to determine the position of said data input means relative to said data surface, said apparatus whereby said data processing means uses the principle of triangulation to determine the position of said data input means relative to said data surface, said apparatus whereby said position-related coding means comprises a selective reflecting means for selectively reflecting at least one selected frequency of light, and said apparatus whereby said data input means comprises a selective detecting means for selectively detecting at least one selected frequency of light.

18. An apparatus for obtaining and outputting the position and movement of a moveable element on a data surface according to claim 16, comprising:

said position-related coding means, whereby said position-related coding means comprises coordinates for a plurality of points on said data surface;

a moveable element comprising said data input means, whereby said movable element is movable relative to said data surface;

means for determining the path of said moveable element by detecting a sequence of coordinates of said plurality of points in the path of said movable element;

means for analyzing the path of said moveable element.

19. An apparatus for obtaining and outputting the position and movement of a moveable element on a data surface according to claim 16, whereby said data input means is selected from the group consisting of an optical stylus comprising a rod shaped optical conduit body member including
a writing means for writing on said data surface and
a detecting means for detecting and outputting said position-related coding means;

an optical stylus comprising
a writing means for writing on said data surface and
a detecting means for detecting and outputting said position-related coding means; and a self-contained optical stylus comprising
a writing means for writing on said data surface,
a detecting means for detecting and outputting said position-related coding means,
a microcomputer,
a user interface means for communicating with a user, and
a device interface means for communicating with other devices.

20. An apparatus for obtaining and outputting the position and movement of a moveable element on a data surface according to claim 16, whereby said position-related coding means comprises:

a plurality of dots systematically coded on said data surface;
each of the plurality of dots comprising three concentric circles partitioned into quadrants;
including a center circle,
an outer ring and an inner ring, whereby
the outer ring represents an X coordinate and the inner ring represents a Y coordinate;
each quadrant of the outer ring and the inner ring representing a digit of a four digit number and further comprising four equal slices; whereby
the upper right quadrants of the outer ring and the inner ring represent the first digit of the four digit number moving clockwise,
a combination of dark and light slices indicate an X-Y coordinate, and
the center circle optionally represents additional data.

* * * * *